US006617805B2

(12) United States Patent
Ribarich et al.

(10) Patent No.: US 6,617,805 B2
(45) Date of Patent: Sep. 9, 2003

(54) BALLAST CONTROL IC WITH POWER FACTOR CORRECTION

(75) Inventors: Thomas J. Ribarich, Laguna Beach, CA (US); Dana S. Wilhelm, Temple City, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/981,753

(22) Filed: Oct. 19, 2001

(65) Prior Publication Data

US 2002/0047635 A1 Apr. 25, 2002

Related U.S. Application Data

(60) Provisional application No. 60/241,795, filed on Oct. 20, 2000.

(51) Int. Cl.[7] .............................. H05B 41/16; G05F 1/00
(52) U.S. Cl. ...................... 315/247; 315/291; 315/307; 315/324; 315/DIG. 7
(58) Field of Search ........................ 315/307, 70, 291, 315/209 R, 224, 308, 347, 247, 127, 91, 27, DIG. 4, DIG. 5, DIG. 7, 324

(56) References Cited

U.S. PATENT DOCUMENTS

| | | | | |
|---|---|---|---|---|
| 5,315,214 A | * | 5/1994 | Lesea ...................... 315/209 R |
| 6,008,593 A | | 12/1999 | Ribarich .................... 315/307 |
| 6,031,342 A | * | 2/2000 | Ribarich et al. ............ 315/291 |
| 6,107,755 A | * | 8/2000 | Katyl et al. ................. 315/307 |
| 6,181,086 B1 | * | 1/2001 | Katyl et al. ................. 315/307 |
| 6,211,623 B1 | | 4/2001 | Wilhelm et al. ............ 315/224 |

OTHER PUBLICATIONS

International Search Report dated Apr. 2, 2002 from the International Searching Authority for corresponding PCT Appln. No. PCT/US01/47007.

* cited by examiner

*Primary Examiner*—Hoang Nguyen
(74) *Attorney, Agent, or Firm*—Ostrolenk, Farber, Gerb & Soffen, LLP

(57) ABSTRACT

An integrated circuit with both ballast control and driver circuitry and power factor correction (PFC) control circuitry. At the beginning of preheating, power is provided to the load circuit at a voltage below a voltage at which the lamp can ignite, and the PFC control circuitry can then bring the DC bus voltage up to its running value. For this purpose, the PFC circuitry is enabled depending on the mode of the ballast control and driver circuitry. The DC bus voltage is regulated at a lower loop speed when the lamp is running than when the lamp is ramping to ignition, to alleviate DC bus droop. A criterion is applied to determine whether over-current detect signals indicate an actual fault. For this purpose, detect signals during ignition ramping can be counted and compared with a fault number. A lamp end-of-life condition can be detected by comparing sensed voltage with upper and lower window voltages. When a lamp is off for only a short time, it can be quickly restarted without full preheating.

27 Claims, 3 Drawing Sheets

BALLAST CONTROL IC WITH POWER FACTOR CORRECTION

This application claims the benefit of U.S. Provisional Application Ser. No. 60/241,795, filed Oct. 20, 2000.

BACKGROUND OF THE INVENTION

1. Field of the Invention

The present invention relates to a circuit for controlling a fluorescent lamp, and more particularly, to an integrated circuit that includes ballast control circuitry, power factor correction circuitry and a half bridge driver in a single monolithic chip.

2. Brief Description of the Related Art

Electronic ballasts for controlling fluorescent or high-intensity discharge (HID) lamps usually require electronics necessary for preheating the lamp filaments, striking the lamp, driving the lamp to a given power, detecting lamp fault conditions, and safely deactivating the circuit.

Electronic ballasts for gas discharge circuits have come into widespread use because of the availability of power MOSFET switching devices and insulated gate bipolar transistors (IGBTs) that can replace previously used pwer bipolar switching devices. A number of integrated circuits (ICs) have been devised for driving gates of power MOSFETs or IGBTs in electronic ballasts. Examples include the IR2155, IR2157, and IR21571 products sold by International Rectifier Corporation and described in U.S. Pat. Nos. 5,545,955 and 6,211,623, the disclosures of which are incorporated herein by reference in their entireties.

The IR2155 gate driver IC offers significant advantages over prior circuits: The driver is packaged in a conventional DIP or SOIC package. The package contains internal level shifting circuitry, under voltage lockout circuitry, deadtime delay circuitry, and additional logic circuitry and inputs so that the driver can self-oscillate at a frequency determined by external resistors and capacitors.

The IR2157 and IR21571 products provide fully integrated ballast control ICs with several features not available in the IR2155. The IR2157 and IR21571 products function in five basic modes of operation and can make transitions between modes based on IC inputs. The modes include undervoltage lockout (UVLO) mode, preheat mode, ignition ramp, run mode, and fault mode. Other features of these ICs include: (i) a start-up procedure that insures a flash-free start without an initial high voltage pulse across the lamp; (ii) non-zero voltage switching protection circuitry; (iii) over-temperature shutdown circuitry; (iv) DC bus and AC on/off control circuitry; and (v) near or below resonance detection circuitry.

Previously available ballast ICs require external components for power factor correction (PFC) control. An example of a PFC control circuit is described in U.S. Pat. No. 6,259,614, the disclosure of which is incorporated herein by reference in its entirety.

In addition, previously available ballast ICs are subject to several operation problems:

One ballast operation problem, the "initial flash problem," can arise when driver circuitry for a half bridge circuit first begins to switch. If the half bridge is powering a load such as a lamp, inductive (L) and capacitive (C) components in the load circuit initially contain no stored energy. For a few initial switching cycles, a very high voltage appears across the C components and also across the lamp. This initial high voltage can be substantially higher than steady state voltage during preheating and can cause the lamp to momentarily ignite or strike, producing an initial flash of the lamp. Because the cathodes of the lamp have not been properly heated at this time, they may be weakened, undesirably shortening the lamp's life.

Another ballast operation problem, the "DC bus droop problem," can arise when the lamp ignites or "strikes." Prior to lamp ignition, current through the load circuit is relatively low compared to load currents when the lamp ignites and runs. Meanwhile, a PFC control circuit conventionally drives a boost switch transistor and inductor to maintain DC bus voltage during this light load, pre-ignition period. When the ballast control circuit begins ignition ramping, the frequency of half bridge switch devices decreases or ramps downward to an ignition frequency. During this downward ramp, current through the L and C components of the load circuit increases as the resonant frequency is approached. The voltage developed across the C component also increases, and when the magnitude of this voltage reaches the ignition voltage of the lamp, the lamp ignites. At lamp ignition, the load current seen by the DC bus increases very abruptly, causing a momentary droop in DC bus voltage. If large enough, this droop could undesirably cause lamp ignition to fail, the lamp to extinguish, and the ballast to sense a fault and shut down.

In the DC bus droop problem, DC bus load can cause a change in DC bus voltage because the PFC control circuit has a finite loop response time. A step change in load current causes a momentary change in the DC bus voltage until the control loop can catch up. Several techniques can be used to reduce this change in DC bus voltage, such as increasing the value of the DC bus storage capacitor and/or increasing control loop speed. Neither of these solutions is ideal in practice, however, because increasing the value of the capacitor also increases its cost and physical size, while increasing control loop speed can lead to instability.

Another ballast operation problem, the "false shutdown problem," can arise during ignition ramping when the lamp ignites. In some cases, current in the lamp circuit, which includes L and C components and the lamp, can momentarily go to zero. If this occurs, no energy is stored and therefore the half-bridge switch devices, such as FETs, will hardswitch, possibly over several cycles. The ballast control circuit may detect this hardswitching as an over-current condition and may therefore shut down. This is undesirable because such false shutdowns make it uncertain whether the lamp will reliably strike.

Previous designs used filter/delay components external to the ballast control IC to alleviate the false shutdown problem. Such components may, however, prevent proper sensing of real faults.

Another ballast operation problem, the "end-of-life detection problem," arises when a lamp approaches the end of its life. The IR2157 and 21571 products described above each have a shutdown (SD) pin, used to shutdown the oscillator, pull gate driver outputs low, and put the IC in an interim micropower state. Input voltage on the SD pin above a threshold indicates lamp fault, lamp exchange, or lamp removal. It would be advantageous to provide circuitry for easier detection of the end of life of a lamp.

Another ballast operation problem, the "delayed restart problem," arises when a lamp is turned off such as by a momentary power outage or brown-out. Restarting of the lamp is conventionally delayed for an undesirably long time while preheating is performed.

SUMMARY OF THE INVENTION

The present invention provides a circuitry for controlling a load circuit including a fluorescent lamp which reduces the number of external components required and alleviates the ballast operation problems described above.

The circuitry of the present invention reduces the number of external components by providing an IC that includes both ballast control circuitry, power factor correction (PFC) circuitry, and a half bridge driver in a single monolithic chip. The ballast control and driver circuitry provides drive signals to a power supply circuit, which delivers power to a load circuit including a fluorescent lamp. The ballast control and driver circuitry also receives sense signals indicating operating conditions of the power supply circuit and/or the load circuit, and responds to the sense signals by modifying the drive signals. The PFC circuitry regulates the voltage at which power is provided to the load circuit by the power supply circuit. Therefore, PFC circuitry and the ballast control and drive circuitry together can control the power supply circuit and the load circuit.

By including PFC circuitry with the ballast control and driver circuitry, the invention eliminates the need for external PFC circuitry. This is advantageous because a full function ballast control IC can be implemented, capable of performing all functions necessary to drive virtually all types of rapid start fluorescent lamps while at the same time performing DC bus voltage regulation. The IC can have appropriate pins, such as pins for providing low and high side drive signals to a half bridge, a regulation pin for providing a signal to regulate voltage at which power is provided to the load circuit, and so forth.

Additional internal circuitry allows a further reduction in pins and external components of a lamp ballast IC, including internal circuitry for coordinating power with drive signals (to address the initial flash problem described above) and internal circuitry for performing power regulation at different control loop speeds (to address the DC bus droop problem described above).

To alleviate the initial flash problem, the present invention includes circuitry which provides power so that the lamp begins preheating at a voltage at which the lamp cannot ignite. The circuitry begins to operate the lamp by providing preheat drive signals for preheating the lamp. At the beginning of the preheat drive signals, the circuit begins providing power at a non-operating voltage at which the lamp cannot ignite and increases to an operating voltage. The operating voltage is maintained while the lamp is running.

The circuitry for eliminating the initial flash problem includes enable circuitry which receives a coordination signal indicating whether the driver circuitry is providing off or on drive signals and, in response, disables the PFC circuitry while off drive signals are provided and enables the PFC circuitry no sooner than the beginning of on drive signals. When the PFC circuitry is enabled, power is initially provided at an unboosted voltage at which the lamp cannot ignite. The PFC circuitry can, as preheating continues, increase to a boosted voltage, which can be the nominal running voltage.

The invention also includes circuitry which operates the PFC circuitry and enables regulation of the DC bus voltage in accordance with information about a mode in which ballast control and driver circuitry operates. The ballast control and driver circuitry has two or more modes and makes transitions between the modes in response to sense signals. The enable circuitry receives a mode signal providing information about the mode in which the ballast control and driver circuitry is operating and responds by enabling or disabling the PFC circuitry.

For example, the mode signal can indicate whether the ballast control and driver circuitry is in one of its operating modes—preheat, ignition ramp, or run—as opposed to one of its non-operating modes—fault or under voltage lockout. When the ballast control and driver circuitry is in an operating mode, the enable circuitry can enable the PFC circuitry, but in a non-operating mode, the enable circuitry can disable the PFC circuitry. Accordingly, this circuitry advantageously activates operation of the PFC control circuitry only during normal ballast operation.

The present invention also regulates the voltage at which power is provided at a lower loop speed when the lamp is running than when the lamp is ramping to ignition, thus eliminating the DC bus droop problem. This technique is implemented by loop control circuitry which regulates the voltage on the DC bus at a high control loop speed during ignition ramp, and at a lower control loop speed during run operation of the lamp. As a result, the control loop can respond more quickly to abrupt changes in DC bus load that occur during the ignition ramp mode; in a ballast, such changes occur during ignition, and the quicker response can therefore help minimize DC bus voltage droop at ignition. During run mode, on the other hand, DC bus voltage regulation can be held stable as the control loop response time can be decreased to its run mode value.

The loop speed set by the regulation circuitry can also depend on the mode in which ballast control and driver circuitry is operating. As a result, the loop speed can be dynamically changed to reduce or minimize DC bus voltage droop.

The loop speed regulation circuitry of the present invention is advantageous in comparison with generally used discrete PFC controller ICs such as the MC34262 from Motorola Corporation or the LX1562 from Linfinity Electronics. Dynamic DC bus voltage control loop response switching is not an option with those ICs. In addition, this implementation can be incorporated in a single IC, reducing the external components and supply current that would be required with discrete implementations.

The false shutdown circuitry of the present invention eliminates false over-current faults, thereby alleviating the false shutdown problem discussed above. The fault detection circuitry of the present invention generates a detect signal indicating that current through the lamp exceeds a threshold. Filter circuitry in the present invention receives the detect signals and, if the detect signals meet a filter criterion, causes the drive circuitry to cease providing drive signals. The filter circuitry preferably includes a counter for counting the number of detect signals. The filter circuitry causes the drive signals to cease only when the number of detect signals reaches a fault number. If the ballast control and driver circuitry has an ignition ramp mode, for example, the counter can be enabled during the ignition ramp mode; in this case, the fault number can be larger than the number of times current through the lamp would normally exceed the threshold during the ignition ramp mode. The counter can be disabled during the run mode so that the filter circuitry causes drive signals to cease each time a detect signal occurs.

The fault counter of the present invention acts as a digital filter, and can be internally programmed to provide a fault signal only when the number of over-current detections during ignition ramp mode is likely to indicate a real over-current fault, thus eliminating or greatly reducing false over-current faults. As a result, external filtering is unnecessary. Further, the fault counter can be bypassed during run mode because the lamp is operating in its stable, steady state and no over-current detections will occur unless there is a real fault such as lamp breakage, short circuit, etc., which should be acted on immediately.

The end-of-life detection problem described above is addressed in the present invention by end-of-life detection circuitry which receives voltage sense signals and, if the indicated voltage across the lamp indicates that the lamp is nearing the end of its life, causes the drive circuitry to cease providing the drive signals. The end-of-life detection circuitry compares voltages indicated by the voltage sense signals with upper and lower window voltages, and causes the drive circuitry to cease if the indicated voltage exceeds the upper window voltage or is less than the lower window voltage. The ballast control and driver circuitry preferably includes threshold circuitry that receives the voltage sense signals and, when the indicated voltage exceeds a threshold voltage, causes the drive circuitry to cease. The threshold voltage can be greater than the upper window voltage.

The end-of-life circuitry and the threshold circuitry preferably operate in accordance with the mode of operation of the ballast control and driver circuitry. Thus, the invention can include shutdown circuitry that receives the end-of-life signals and the over-threshold signals and causes the drive circuitry to cease in response to the end-of-life signal only during the run mode but causes the drive circuitry to cease in response to the over-threshold signal during any mode.

The delayed restart problem described above is addressed by circuitry which preheats a lamp for a shorter time during re-start than when initially starting the lamp. In other words, the duration of a preheat mode is shortened because the lamp cathodes retain some heat so that full preheat duration is unnecessary. This technique advantageously reduces the lamp off time in cases such as a momentary power outage or brown-out. Reducing lamp off time can be important in certain situations.

The circuitry for addressing the delayed restart problem measures the interval from when the drive signals in the starting sequence cease until restart time. If the measured interval is less than a time after which full preheating is needed, such as one second, the restart sequence is provided, with shorter duration preheating.

In accordance with the present invention, all of the above circuitry is implemented together in a single IC. The result is a greatly improved, full function ballast control IC. Advantageously, the IC includes dynamic control loop response switching, minimal pins for external connection, requires minimal external components, has low supply current needs, and generally provides a vast improvement over implementations requiring discrete PFC control circuitry.

Other features and advantages of the present invention will become apparent from the following description of the invention which refers to the accompanying drawings.

DETAILED DESCRIPTION OF THE PREFERRED EMBODIMENT

Figure 1:
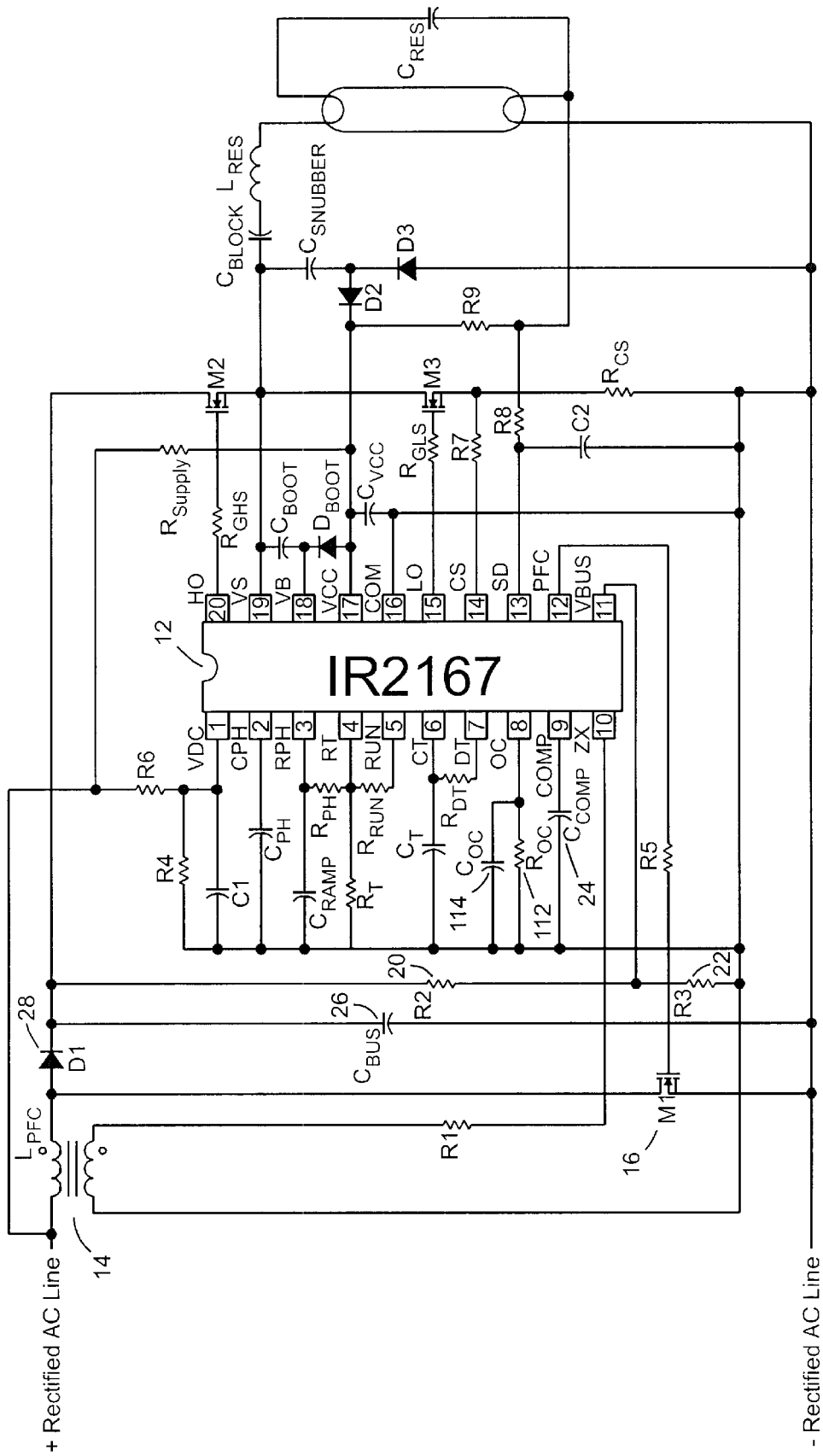
FIG. 1 is a schematic circuit diagram showing pins and external components connected to an IC that includes a ballast/lamp control section, a half bridge driver, and a PFC section.

FIG. 1 shows a typical application for a fully featured lamp ballast control IC that includes full lamp and ballast protection and power factor correction.

Circuit 10 in FIG. 1 illustrates pins and external connections for IC 12, in which the circuitry of the present invention is implemented. IC 12 is illustratively a product of assignee, International Rectifier Corporation, identified as the IR2167 IC. Most of the pins and external connections of IC 12 can be understood from the description of their counterparts in the IR2157, disclosed in U.S. Pat. No. 6,211,623, incorporated by reference herein in its entirety. The '623 patent also includes a full description of components that have counterparts in a ballast/lamp control section and a half bridge driver in IC 12. Further implementation details are provided in the IR2167 data sheet, available from International Rectifier Corporation and incorporated herein by reference in its entirety.

In addition to the ballast control section and half bridge driver of the IR2157 IC, however, IC 12 of the present invention also includes a PFC section implemented substantially as described in U.S. Pat. No. 6,259,614, incorporated by reference herein in its entirety. Operations of the primary and secondary coils of inductor 14, of boost MOSFET 16, of the voltage divider network with resistances 20 and 22, of compensation capacitor 24, of DC bus capacitor 26, and of diode 28 can be understood from the description of counterpart elements in the '614 patent. As will be understood, the COMP pin of IC 12 corresponds to the CMP pin of IC 32 in the '614 patent; the ZX pin to the IDET pin; the VBUS pin to the INV pin; and the PFC pin to the OUT pin.

Figure 2:
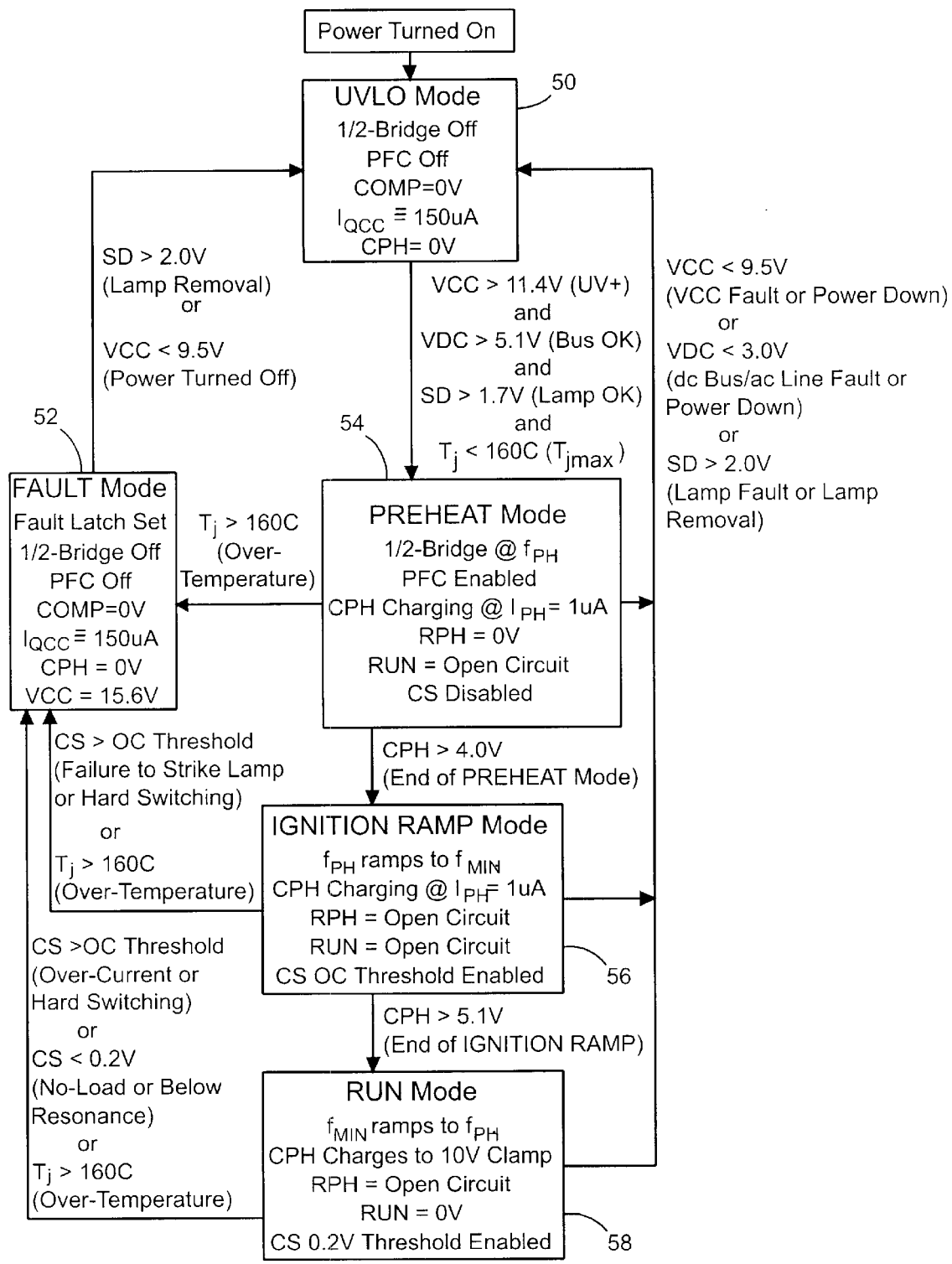
FIG. 2 is a mode-transition diagram for the IC in FIG. 1.

FIG. 2 shows a mode-transition diagram for IC 12. Although FIG. 2 includes the same five modes as illustrated in FIG. 1 of the '623 patent—under voltage lockout mode, preheat mode, ignition ramp mode, run mode, and fault mode—and is similar to FIG. 1 of the '623 patent in many other respects, FIG. 2 also shows some interactions between the ballast control section and the PFC section of IC 12. Specifically, boxes 50 and 52 show that the PFC section is disabled during the non-operating modes—under voltage lockout mode and fault mode, respectively, while box 54 shows that the PFC section is enabled not sooner than the beginning of the preheat mode and remains enabled until the fault mode or under voltage lockout mode occurs again. Enabling the PFC section not sooner than the beginning of preheating protects against the initial flash problem described above. Other interactions between the ballast control section and the PFC section will be understood from the description below.

FIG. 2 also shows improvements in the ballast control section of IC 12. As shown along the line from box 56 to box 52 and along the line from box 58 to box 52, the current sense signal received at the CS pin is compared with an over-current threshold ("CS+ threshold") to detect an over-current condition. In the ignition ramp mode in box 56, a fault counter ("CS+ Counter") is enabled and counts the number of times an over-current condition is detected; the transition from the ignition ramp mode in box 56 to the fault mode in box 52 is made only when an over-current condition is detected and the fault counter has counted 50 previous detections, thus protecting against false over-current shutdown. The fault counter is not used in making a transition from the run mode in box 58; however, a single run mode detection of an over-current condition will cause a transition to the fault mode in box 52.

As shown along the line from boxes 54, 56, and 58 back to box 50 and along the line from box 52 to box 50, the voltage sense signal received at the SD pin is compared with a threshold voltage of 5.1 volts to detect lamp removal. As shown along the line from box 58 to box 52, however, the voltage sense signal received at the SD pin is compared with an upper window voltage of 3 volts and a lower window voltage of 1 volt to detect an impending lamp end-of-life condition. These comparisons, which ease end-of-life detection, will be further understood from the description below.

Figure 3:
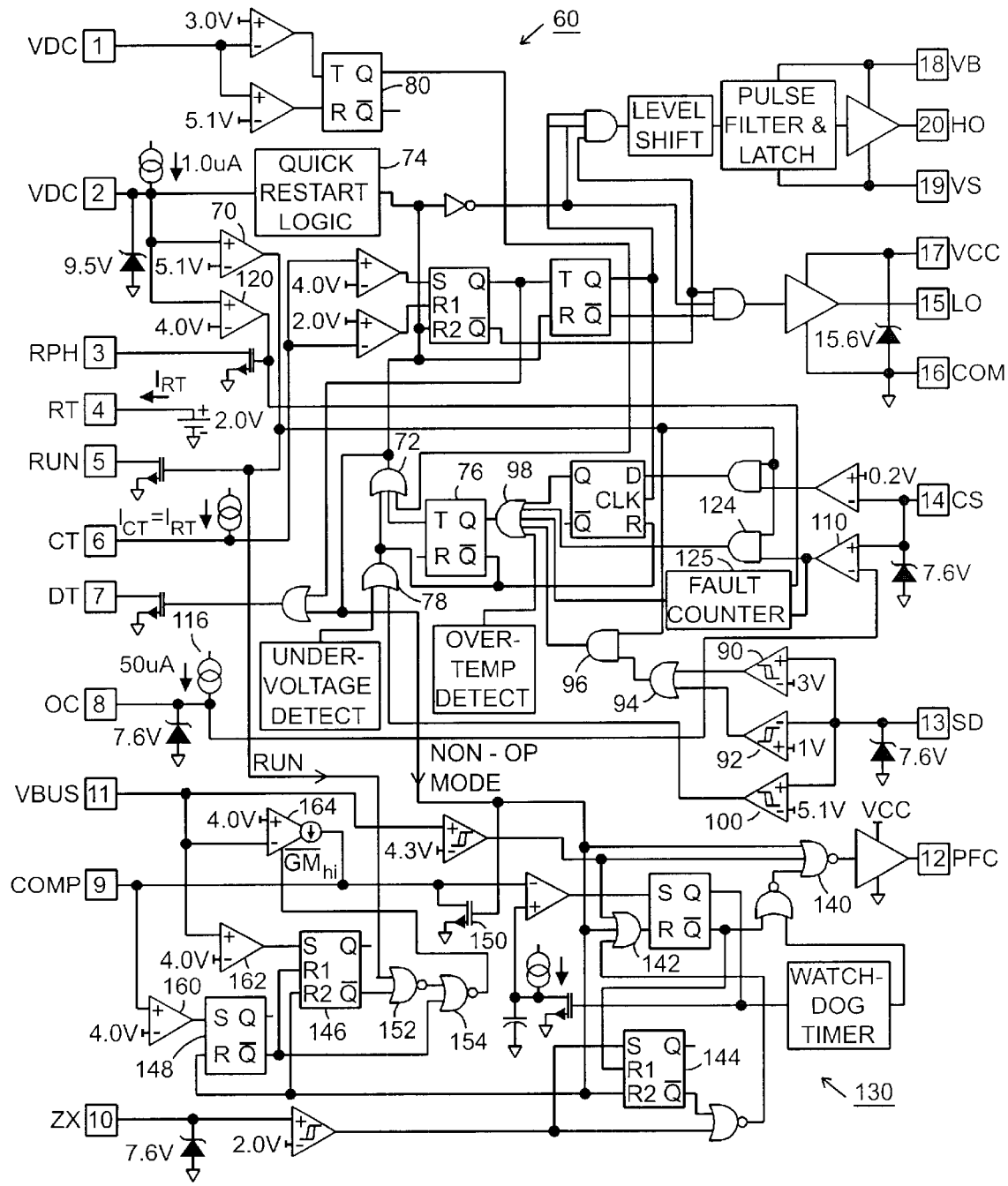
FIG. 3 is a schematic circuit diagram showing components of the IC in FIG. 1.

FIG. 3 shows the internal circuitry of IC 12, with circuitry 60 at the upper section including the ballast/lamp control and half bridge driver sections and with the lower section of FIG. 3 showing the PFC section. As can be seen, two mode signals are provided from the ballast/lamp control and half bridge driver sections to the PFC circuitry. One mode signal, labeled "RUN", is high when the ballast/lamp control and half bridge driver circuitry is in run mode and low when not in run mode. The other mode signal, labeled "NON-OP MODE", is low when the ballast/lamp control and half bridge driver circuitry is in one of its operating modes—preheat, ignition ramp, or run—and is high in either non-operating modes—fault or under voltage lockout.

The RUN signal goes high when the output from comparator 70 indicates that the voltage on the CPH pin exceeds 5.1 volts, the condition for making the transition from ignition ramp mode to run mode. The RUN signal remains high until the output from OR gate 72 goes high, activating QUICK RESTART logic 74 and pulling the CPH pin to ground.

The output from OR gate 72 is also the NON-OP MODE signal. The output from OR gate 62 goes high when any of the conditions for making the transition from run mode to fault mode occur, as indicated by fault latch 76, or when any of the conditions for making the transition from run mode to under voltage lockout mode occur, as indicated by the output from OR gate 78 or from VDC latch 80.

Comparators 90 and 92 perform end-of-life detection by comparing the voltage on the SD pin, indicating voltage across the lamp, with upper and lower window voltages, respectively. The upper window voltage is illustratively 3 volts, and the lower window voltage 1 volt. As a lamp nears the end of its life, voltage on the SD pin shifts, until finally it shifts enough to fall outside the window defined by these voltages. If either comparator provides a high output, the output of OR gate 94 goes high. If this occurs while the RUN signal is high, the output of AND gate 96 also goes high, and fault latch 76 is set through OR gate 98, thus causing the NON-OP MODE signal to go high and making a transition to fault mode.

Comparator 100, on the other hand, performs lamp removal detection by comparing the voltage on the SD pin with a threshold voltage of 5.1 volts. If comparator 100 provides a high output, OR gate 78 provides a high output, thus causing the NON-OP MODE signal to go high and making a transition to under voltage lockout mode. Later, when voltage at the SD pin is taken back down below this upper shutdown voltage, circuitry 60 goes through a complete start-up sequence, assuming no other fault condition have occurred.

Comparator 110 performs over-current detection by comparing voltage on the CS pin, indicating current through the lamp, with voltage on the OC pin, which is biased to provide an appropriate voltage by overcurrent resistor 112 and overcurrent capacitor 114, both shown in FIG. 1, and driven by current source 116. If comparator 110 provides a high output, and if the circuit is either in ignition ramp mode or run mode as indicated by a high signal applied to the other input to AND gate 124, then the output from AND gate 124 goes high, and fault latch 76 is similarly set through OR gate 98, thus causing the NON-OP MODE signal to go high and making a transition to fault mode.

In addition, a fault counter, identified in FIG. 3 by reference number 125, which is enabled only during ignition ramp, provides an output indicating that the number of faults is larger than a predetermined number during ignition ramp mode. The transition from ignition ramp mode to fault mode is made only if the output from the fault counter 125 exceeds the predetermined fault number.

QUICK RESTART 74 is activated when the RUN signal goes low. When the NON-OP MODE signal goes low to indicate that preheat mode is beginning, additional logic can compare the timer output with a time after which full preheating is needed, and if the timer output is less, a transition from preheat mode to ignition ramp mode can be made immediately rather than waiting for the voltage on the CPH pin to reach 4.0 volts as in FIG. 2.

In general, other components in FIG. 3 can be understood from the figure itself or from the description of their counterparts in the '623 patent.

When the NON-OP SIGNAL from ballast/lamp control and half bridge driver circuitry 60 is high, PFC circuitry 130 is generally disabled, so that the PFC control circuitry does not operate during fault mode and under voltage lockout mode. When the NON-OP SIGNAL goes low at the beginning of preheat mode, circuitry 130 is generally enabled, and begins to boost voltage by providing signals through the PFC pin in a manner that can be understood from the '614 patent. Because circuitry 130 has been enabled, however, the preheat mode begins with the DC bus at a non-operating voltage that is lower than the voltage at which the lamp ignites.

The signals through the PFC pin bring the DC bus voltage to its nominal running level only after the first few initial switching cycles of the half bridge driver section. During the initial half bridge switching, the voltage appearing across the capacitance in the load circuit, and also across the lamp, is therefore too low to ignite the lamp. The DC bus rises to its nominal running level while circuitry 60 is in preheat mode and thereafter is regulated and held constant by circuitry 130.

The NON-OP MODE signal is received by NOR gate 140, OR gate 142, the R2 reset lead of latches 144 and 146, and the R reset lead of latch 148. In addition, the NON-OP MODE signal turns on MOSFET 150, pulling the voltage on the COMP pin to ground. The RUN signal is received only by NOR gate 152, which also receives the NOT Q output from latch 146. NOR gate 154, in turn, receives the output from NOR gate 152 and the NOT Q output from latch 144. Therefore, if latches 146 and 148 have been set by high outputs from comparators 160 and 162 and if the NON-OP MODE signal is low so that circuitry 130 is enabled, the output of NOR gate 154 will remain low until the run mode begins and the RUN signal goes high. At that time, the output of NOR gate 152 goes low and the output of NOR gate 154 therefore goes high, causing the output from error amplifier 164 to change dynamically, reducing the control loop speed of circuitry 130 from the speed it had during ignition ramp mode.

In general, other components of PFC circuitry 130 can be understood from the figure itself or from the description of their counterparts in the '614 patent.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An integrated circuit for controlling a power supply circuit which delivers power to a load circuit that includes a fluorescent lamp, comprising:

ballast control and driver circuitry that provides drive signals to the power supply circuit, that receives sense signals indicating operating conditions of at least one of the power supply circuit and the load circuit, and that responds to the sense signals by modifying the drive signals;

the ballast control and driver circuitry further having a set of two or more modes in any of which it can operate;

the ballast control and driver circuitry making transitions between the modes in response to the sense signals;

power factor correction circuitry that regulates the power provided to the load circuit by the power supply circuit;

enable circuitry that receives a first mode signal with information about the mode in which the ballast control and driver circuitry is operating and, in response, enables or disables the regulation circuitry; and loop speed circuitry that receives a second mode signal with information about the mode in which the ballast control and driver circuitry is operating and, in response, causes the regulation circuitry to operate at a control loop speed that depends on the second mode signal;

the sense signals including current sense signals indicating current through the lamp and voltage sense signals indicating voltage across the fluorescent lamp;

the ballast control and driver circuitry including:

drive circuitry that provides the drive signals;

fault detection circuitry that receives current sense signals and provides a detect signal when current through the lamp exceeds a threshold;

filter circuitry that receives the detect signals and, if the detect signals meet a filter criterion, causes the drive circuitry to cease providing the drive signals; and end-of-life detection circuitry that receives the voltage sense signals and, if the indicated voltage across the lamp indicates that the lamp is nearing the end of its life, causes the drive circuitry to cease providing the drive signals;

the ballast control and driver circuitry operating to:

provide a first sequence of drive signals that cause the power supply circuit to provide power to the load circuit to start the lamp;

the first sequence including preheat drive signals for preheating the lamp and run drive signals for running the lamp;

the preheat drive signals being provided for a first duration;

in response to the sense signals, cease providing drive signals at a time while the lamp is running; and provide a second sequence of drive signals that cause the power supply circuit to provide power to the load circuit for restarting the lamp;

the second sequence including preheat drive signals for preheating the lamp and run drive signals for running the lamp;

the preheat drive signals being provided in the second sequence for a second duration that is shorter than the first duration.

2. An integrated circuit for controlling a power supply circuit which delivers power to a load circuit that includes a fluorescent lamp, comprising:

ballast control and driver circuitry that provides drive signals to the power supply circuit, that receives sense signals indicating operating conditions of at least one of the power supply circuit and the load circuit, and that responds to the sense signals by modifying the drive signals; and power factor control circuitry that regulates the voltage at which power is provided to the load circuit by the power supply circuit, further wherein the power supply circuit includes a half bridge circuit with low and high side power devices, the drive signals including low side drive signals to control the low side power device and high side drive signals to control the high side power device;

the ballast control and driver circuitry including a low side drive output for providing the low side drive signals to the low side power device and a high side drive output for providing the high side drive signals to the high side power device.

3. A method of controlling a power supply circuit and a load circuit that includes a fluorescent lamp, the power supply circuit providing power to the load circuit, the method comprising the steps of:

beginning to operate the fluorescent lamp by providing preheat drive signals that cause the power supply circuit to provide power to the load circuit for preheating the lamp; and at the beginning of the preheat drive signals, beginning to provide power at a non-operating voltage and increasing to an operating voltage, the non-operating voltage being a voltage at which the lamp cannot ignite.

4. The method of claim 3, further comprising maintaining the operating voltage while the lamp is running.

5. A control circuit for controlling a power supply circuit which delivers power to a load circuit that includes a fluorescent lamp, comprising:

driver circuitry that provides drive signals to the power supply circuit, the driver circuitry providing off drive signals that prevent the power supply circuit from providing power to the load circuit, then providing on drive signals that cause the power supply circuit to provide power to the load circuit for preheating the lamp;

power factor correction circuitry that boosts the voltage at which power is provided to the load circuit; and enable circuitry that receives a coordination signal indicating whether the driver circuitry is providing off drive signals or on drive signals and, in response, disabling the power factor correction circuitry while off drive signals are provided and enabling the power factor correction circuitry no sooner than when on drive signals begin; when the power factor correction circuitry is enabled at the beginning of the on drive signals, power being initially provided at an unboosted voltage at which the lamp cannot ignite.

6. The control circuit of claim 5 in which, as preheating continues, the power factor correction circuitry increases the voltage at which power is provided until reaching a boosted voltage.

7. A control circuit for controlling a power supply circuit which delivers power to a load circuit that includes a fluorescent lamp, comprising:

ballast control and driver circuitry that provides drive signals to the power supply circuit, that receives sense signals indicating operating conditions of at least one of the power supply circuit and the load circuit, and that responds to the sense signals by modifying the drive signals;

the ballast control and driver circuitry further having a set of two or more modes in any of which it can operate, the ballast control and driver circuitry making transitions between the modes in response to the sense signals;

power factor correction circuitry that regulates the voltage at which power is provided to the load circuit; and enable circuitry that receives a mode signal with information about the mode in which the ballast control and driver circuitry is operating and, in response, enables or disables the power factor correction circuitry.

8. The control circuit of claim 7, in which the set of modes includes operating modes and non-operating modes, and the mode signal indicates whether the ballast control and driver circuitry is in one of the operating modes or in one of the non-operating modes, if the mode signal indicates an operating mode, the enable circuitry enables the power factor correction circuitry;

if the mode signal indicates a non-operating mode, the enable circuitry disables the power factor correction circuitry.

9. The control circuit of claim 8, in which the operating modes include a preheat mode, an ignition ramp mode, and a run mode and in which the non-operating modes include a fault mode and an under voltage lockout mode.

10. The control circuitry of claim 9, in which the preheat mode follows the under voltage lockout mode;

during the non-operating modes, power is provided at a non-operating voltage below a voltage at which the lamp ignites;

the power factor correction circuitry beginning to operate not before the beginning of the preheat mode so that power is initially provided at the non-operating voltage during the preheat mode.

11. A method of controlling a power supply circuit which provides power from a DC bus to a load circuit that includes a fluorescent lamp, comprising the steps of:

providing drive signals that cause the power supply circuit to provide power to the load circuit, the drive signals including ignition ramp drive signals for ramping the fluorescent lamp to ignition and run drive signals for running the lamp;

while providing the ignition ramp drive signals, regulating voltage on the DC bus at a first control loop speed; and while providing the run drive signals, regulating voltage on the DC bus at a second control loop speed that is less than the first control loop speed.

12. A control circuit for controlling a power supply circuit which provides power from a DC bus to a load circuit that includes a fluorescent lamp, comprising:

ballast control and driver circuitry that provides drive signals to the power supply circuit, that receives sense signals indicating operating conditions of at least one of the power supply circuit and the load circuit, and that responds to the sense signals by modifying the drive signals;

the ballast control and driver circuitry further having a set of modes in which it can operate;

the ballast control and driver circuitry making transitions between the modes in response to the sense signals;

regulation circuitry that regulates a voltage on the DC bus; and loop speed circuitry that receives a mode signal with information about the mode in which the ballast control and driver circuitry is operating and, in response, causes the regulation circuitry to operate at a control loop speed that depends on the mode signal.

13. The control circuit of claim 12, in which the modes include an ignition ramp mode and a run mode during which the ballast control and driver circuitry provides drive signals that cause the power supply circuit to provide power to the load circuit for ramping the lamp to ignition and for running the lamp, respectively, the mode signal providing information about when the ballast control and driver circuitry makes a transition from the ignition ramp mode to the run mode;

the loop speed circuitry causing the regulation circuitry to go from a higher control loop speed to a lower control loop speed when the ballast control and driver circuitry makes the transition.

14. The control circuit of claim 12, in which the regulation circuitry includes PFC control circuitry.

15. An integrated circuit for controlling a power supply circuit which delivers power to a load circuit that includes a fluorescent lamp, comprising:

ballast control and driver circuitry that provides drive signals to the power supply circuit, that receives current sense signals indicating current through the lamp, and that responds to the current sense signals by modifying the drive signals;

the ballast control and driver circuitry including:
drive circuitry that provides the drive signals;
fault detection circuitry that receives the current sense signals and provides a detect signal when current through the lamp exceeds a threshold; and
filter circuitry that receives the detect signals and, if the detect signals meet a filter criterion, causes the drive circuitry to cease providing the drive signals.

16. The integrated circuit of claim 15, in which the filter circuitry includes a counter for counting the number of detect signals, the filter circuitry causing the drive circuitry to cease only if the number of detect signals reaches a fault number.

17. The integrated circuit of claim 16, in which the ballast control and driver circuitry has an ignition ramp mode during which it provides drive signals that cause the power supply circuit to provide power to the load circuit for ramping the fluorescent lamp to ignition;

the counter operating only during the ignition ramp mode to determine whether the number of detect signals reaches the fault number;

the fault number being larger than the number of times that current through the lamp would normally exceed the threshold during the ignition ramp mode.

18. The integrated circuit of claim 17, in which the ballast control and driver circuitry has a run mode during which it provides drive signals that cause the power supply circuit to provide power to the load circuit for running the fluorescent lamp;

the counter not operating during the run mode so that the filter circuitry causes the drive circuitry to cease each time a detect signal occurs.

19. A control circuit for controlling a power supply circuit which delivers power to a load circuit that includes a fluorescent lamp, comprising:

ballast control and driver circuitry that provides drive signals to the power supply circuit, that receives voltage sense signals indicating a voltage across the lamp, and that responds to the voltage sense signals by modifying the drive signals;

the ballast control and driver circuitry including:
drive circuitry that provides the drive signals;
end-of-life detection circuitry that receives the voltage sense signals and, if the indicated voltage across the lamp indicates that the lamp is nearing the end of its life, causes the drive circuitry to cease providing the drive signals.

20. An integrated circuit that includes the control circuit of claim 19, the integrated circuit further including a voltage sense pin for receiving the voltage sense signals.

21. The control circuit of claim 19, in which the end-of-life detection circuitry compares voltages indicated by the voltage sense signals with upper and lower window voltages;
the end-of-life detection circuitry causing the drive circuitry to cease if the indicated voltage exceeds the upper window voltage or is less than the lower window voltage.

22. The control circuit of claim 21, in which the ballast control and driver circuitry further includes threshold circuitry that receives the voltage sense signals and, when the indicated voltage exceeds a threshold voltage, causes the drive circuitry to cease providing the drive signals;
the threshold voltage being greater than the upper window voltage.

23. The control circuit of claim 22, in which the ballast control and driver circuitry has a set of modes including a run mode during which it provides drive signals that cause the power supply circuit to provide power to the load circuit for running the lamp;
the end-of-life detection circuitry providing an end-of-life signal when the indicated voltage exceeds the upper window voltage or is less than the lower window voltage;
the threshold circuitry providing a over-threshold signal when the indicated voltage exceeds the threshold voltage;
the ballast control and driver circuitry further including:
shutdown circuitry that receives the end-of-life signals and the over-threshold signals and that causes the drive circuitry to cease in response to the end-of-life signal only during the run mode but causes the drive circuitry to cease in response to the over-threshold signal during any of the set of modes.

24. A method of controlling a power supply circuit which supplies power to a load circuit that includes a fluorescent lamp, comprising the steps of:
providing a first sequence of drive signals that cause the power supply circuit to provide power to the load circuit to start the fluorescent lamp;
the first sequence including preheat drive signals for preheating the lamp and run drive signals for running the lamp;
the preheat drive signals being provided for a first duration;
in response to sense signals indicating operating conditions of at least one of the power supply circuit and the load circuit, ceasing to provide drive signals at a time while the lamp is running; and
providing a second sequence of drive signals that cause the power supply circuit to provide power to the load circuit for restarting the lamp;
the second sequence including preheat drive signals for preheating the lamp and run drive signals for running the lamp;
the preheat drive signals being provided in the second sequence for a second duration that is shorter than the first duration.

25. The method of claim 24, further comprising:
measuring an interval from when drive signals cease until a restart time after which the fluorescent lamp can be restarted; and
if the measured interval is less than a time after which the fluorescent lamp requires full preheating, providing the second sequence of drive signals with the second duration shorter than the first duration.

26. A control circuit for controlling a power supply circuit which delivers power to a load circuit that includes a fluorescent lamp, comprising:
ballast control and driver circuitry that provides drive signals to the power supply circuit, that receives sense signals indicating operating conditions of at least one of the power supply circuit and the load circuit, and that responds to the sense signals by modifying the drive signals;
the ballast control and driver circuitry operating to:
provide a first sequence of drive signals that cause the power supply circuit to provide power to the load circuit to start the lamp;
the first sequence including preheat drive signals for preheating the lamp and run drive signals for running the lamp;
the preheat drive signals being provided for a first duration;
in response to sense signals indicating operating conditions of at least one of the power supply circuit and the load circuit, cease providing drive signals at a time while the lamp is running; and
provide a second sequence of drive signals that cause the power supply circuit to provide power to the load circuit for restarting the lamp;
the second sequence including preheat drive signals for preheating the lamp and run drive signals for running the lamp;
the preheat drive signals being provided in the second sequence for a second duration that is shorter than the first duration.

27. An integrated circuit that includes the control circuit of claim 26, the integrated circuit further including a sense pin for receiving the sense signals.

* * * * *